United States Patent
Srichai et al.

(10) Patent No.: US 11,970,048 B2
(45) Date of Patent: Apr. 30, 2024

(54) METHODS AND SYSTEMS FOR DEFROSTING A TRANSPORT CLIMATE CONTROL SYSTEM EVAPORATOR

(71) Applicant: THERMO KING LLC, Minneapolis, MN (US)

(72) Inventors: Panayu Robert Srichai, Minneapolis, MN (US); Bradley M. Ludwig, Minnetonka, MN (US); Christopher John Vath, Golden Valley, MN (US)

(73) Assignee: THERMO KING LLC, Minneapolis, MN (US)

( * ) Notice: Subject to any disclaimer, the term of this patent is extended or adjusted under 35 U.S.C. 154(b) by 68 days.

(21) Appl. No.: 17/407,561

(22) Filed: Aug. 20, 2021

(65) Prior Publication Data
US 2023/0059306 A1 Feb. 23, 2023

(51) Int. Cl.
  *B60H 1/32* (2006.01)
(52) U.S. Cl.
  CPC ........... *B60H 1/321* (2013.01); *B60H 1/3232* (2013.01); *B60H 2001/3288* (2013.01)
(58) Field of Classification Search
  CPC .................. B60H 1/321; B60H 1/3232; B60H 2001/3288
  See application file for complete search history.

(56) References Cited

U.S. PATENT DOCUMENTS

| | | | |
|---|---|---|---|
| 3,359,751 A * | 12/1967 | Stevens | F25D 17/065 62/186 |
| 3,559,421 A | 2/1971 | Nussbaum | |
| 5,406,805 A | 4/1995 | Radermacher et al. | |
| 6,694,765 B1 | 2/2004 | Waldschmidt et al. | |
| 9,052,131 B2 | 6/2015 | Reimann et al. | |
| 2004/0020228 A1 * | 2/2004 | Waldschmidt | F25D 21/06 62/276 |

(Continued)

FOREIGN PATENT DOCUMENTS

| | | |
|---|---|---|
| JP | 2004-085109 | 3/2004 |
| JP | 2005-226875 | 8/2005 |

OTHER PUBLICATIONS

"The Centinel Intelligent Defrost Control System", Century Refrigeration, 2020, 33 pages, available at: https://century-refrigeration.com/literature/.

(Continued)

*Primary Examiner* — Nelson J Nieves
*Assistant Examiner* — Matthew John Moscola
(74) *Attorney, Agent, or Firm* — HSML P.C.

(57) ABSTRACT

A transport climate control system for providing climate control to a climate controlled space of a transport unit. The transport climate control circuit includes a compressor, an evaporator and at least two fans. The transport climate control circuit also includes a controller for controlling the transport climate control circuit and for defrosting the evaporator coil. When a defrost event is triggered, the controller instructs the transport climate control circuit to supply heat to or around one section of the evaporator coil, and independently controls each of the at least two fans to move the air around the evaporator coil in a controlled direction so that heat from the one section of the evaporator coil is used to convectively heat the inlet of the evaporator coil.

14 Claims, 10 Drawing Sheets

(56) References Cited

U.S. PATENT DOCUMENTS

2012/0023993 A1\* 2/2012 Palmer .................... F28F 17/00
62/276
2020/0208900 A1\* 7/2020 Lavrich ............. B60H 1/00492
2021/0254881 A1\* 8/2021 Kondrk ................ F25D 21/025
2022/0307874 A1\* 9/2022 Wenger ................. B60H 1/008

OTHER PUBLICATIONS

Extended European Search Report, issued in the corresponding European patent application No. 22191277.7, dated Jan. 20, 2023, 8 pages.

\* cited by examiner

METHODS AND SYSTEMS FOR DEFROSTING A TRANSPORT CLIMATE CONTROL SYSTEM EVAPORATOR

FIELD

This disclosure relates generally to a transport climate control system. More specifically, the disclosure relates to methods and systems for providing energy efficient defrosting of a transport climate control system evaporator.

BACKGROUND

A transport climate control system can include, for example, a transport refrigeration system (TRS) and/or a heating, ventilation and air conditioning (HVAC) system. A TRS is generally used to control an environmental condition (e.g., temperature, humidity, air quality, and the like) within an internal space or cargo space of a transport unit (e.g., a truck, a container (such as a container on a flat car, an intermodal container, etc.), a box car, a semi-tractor, a bus, or other similar transport unit). The TRS can maintain environmental condition(s) of the internal space to maintain cargo (e.g., produce, frozen foods, pharmaceuticals, etc.) In some embodiments, the transport unit can include a HVAC system to control a climate within a passenger space of the vehicle.

SUMMARY

This disclosure relates generally to a transport climate control system. More specifically, the disclosure relates to methods and systems for defrosting a transport climate control system having a transport climate control circuit that includes an evaporator.

The embodiments described herein can be used in a mechanically powered (e.g., prime mover powered), electrically powered (e.g., battery powered), or a hybrid powered (e.g., combination of mechanically and electrically powered) transport climate control systems where maximizing operation of the transport climate control system and minimizing energy (e.g., battery) usage while in transit can be important.

The embodiments described herein can remove frost buildup on a transport climate control system evaporator coil that can occur, for example, during hot and/or humid ambient conditions outside of a climate controlled space (e.g., an internal or cargo space of a transport unit, a passenger space of a vehicle, etc.) being conditioned by the transport climate control system. It will be appreciated that frost buildup on the evaporator coil that is not periodically removed can reduce the cooling capacity of the transport climate control system and can lead to damage to the transport climate control system and increased power consumption of the transport climate control system.

Embodiments disclosed herein use convection heat to defrost ice/frost formed on an evaporator coil of the evaporator in the transport climate control system by independently controlling at least two evaporator fans in the evaporator. Embodiments disclosed herein can provide a transport climate control circuit and a controller. The transport climate control system includes the transport climate control circuit that includes a compressor that compresses a working fluid passing through the transport climate control circuit, the evaporator that absorbs heat from a climate controlled space and evaporates the working fluid, and at least two evaporator fans that control air flow around the evaporator coil of the evaporator. The controller is configured to control the transport climate control circuit and to defrost the evaporator coil. When a defrost event is triggered (e.g., based on temperature, pressure, and/or humidity data in the evaporator or on door opening events), the controller instructs the transport climate control circuit to supply heat to or around one section of the evaporator coil, and independently controls the at least two fans to move the air around the evaporator coil in controlled directions so that heat from one section of the evaporator coil is used to convectively heat the inlet of the evaporator coil. In an embodiment, the evaporator further includes a damper to prevent the heated air from entering the climate controlled space. The damper can be a damper blade that uses a damper solenoid that when activated closes the damper blade or similar structure that is able to prevent the heated air from entering the climate controlled space or leaving the evaporator during defrost.

In another embodiment, a method for defrosting an evaporator of a transport climate control circuit of a transport climate control system that provides climate control to a climate controlled space of a transport unit is provided. The transport climate control circuit includes a compressor, an evaporator that includes an evaporator coil, and at least two fans. The method includes a controller of the transport climate control system detecting whether a defrost event condition occurs. The method further includes upon detecting the defrost event condition: supplying heat to or around one section of the evaporator coil; independently controlling a first fan of the at least two fans to move air around the evaporator coil in a first controlled direction so that heat from the one section of the evaporator coil is used to convectively heat a first side of the inlet of the evaporator coil, and independently controlling a second fan of the at least two fans to move air around the evaporator coil in a second controlled direction so that heat from the one section of the evaporator coil is used to convectively heat a second side of the inlet of the evaporator coil.

In some embodiments, the supply of heat is provided by an electric heating device (e.g., a device that includes an electrical resistor) that is provided adjacent to or on the evaporator coil, i.e., on a face of an evaporator coil. The at least two fans are then independently controlled to move the air around the evaporator coil in controlled directions (e.g., counterclockwise or clockwise direction) so that frost formed at the inlet of the evaporator coil can be defrosted. In other embodiments, the supply of heat is provided from the working fluid from the discharge of the compressor or from a thermal energy system.

Accordingly, in some embodiments, the heat supplied to the evaporator coil is not used to directly heat the frost formed on the evaporator coil, but is distributed around the evaporator coil for selective heating of different portions or sections of the evaporator coil. In some embodiments, since the frost is not directly heated, the frost does not sublimate to vapor, but instead is melted to water so that the water can be removed from the evaporator (e.g., via a drip line/pan and water outlet).

Other features and aspects will become apparent by consideration of the following detailed description and accompanying drawings.

BRIEF DESCRIPTION OF THE DRAWINGS

References are made to the accompanying drawings that form a part of this disclosure and which illustrate embodiments in which the systems and methods described in this specification can be practiced.

Like reference numbers represent like parts throughout.

DETAILED DESCRIPTION

This disclosure relates generally to a transport climate control system. More specifically, the disclosure relates to methods and systems for providing energy efficient defrosting of a transport climate control system evaporator.

Figure 1A:
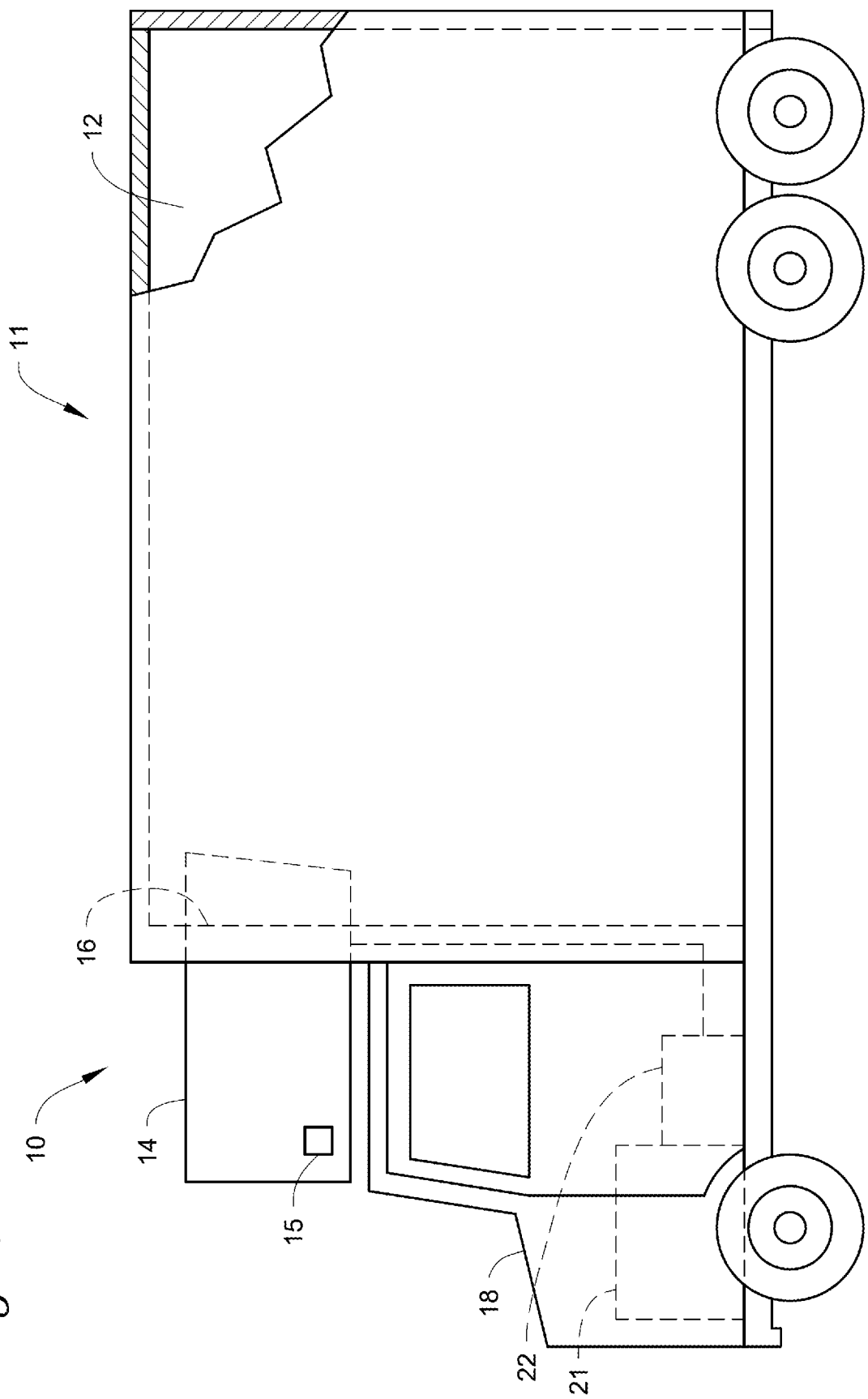
FIG. 1A illustrates a side view of a truck with a front wall mounted transport climate control unit, according to one embodiment.

FIG. 1A depicts a temperature-controlled straight truck 11 that includes a climate controlled space 12 for carrying cargo and a transport climate control system 10 for providing climate control to the climate controlled space 12. The transport climate control system 10 includes a transport climate control unit (TCCU) 14 that is mounted to a front wall 16 of the climate controlled space 12. The TCCU 14 includes a transport climate control circuit that connects, for example, a compressor, a condenser, an evaporator, and an expansion valve, and includes at least two fans and a damper to provide conditioned air within the climate controlled space 12.

The climate control system 10 also includes a programmable climate controller 15 and one or more sensors (not shown) that are configured to measure one or more parameters of the climate control system 10 and communicate parameter data to the climate controller 15. The climate controller 15 may comprise a single integrated control unit or may comprise a distributed network of climate controller elements. The number of distributed control elements in a given network can depend upon the particular application of the principles described herein. The climate controller 15 is configured to control operation of the climate control system 10 including a transport climate control circuit.

The truck 11 further includes a vehicle power bay 18, which houses a prime mover 21, such as a combustion engine (e.g., diesel engine, etc.), an electric motor, etc. that provides power to move the truck 11 and to operate the TCCU 14. In some embodiments, the prime mover 21 can work in combination with an optional machine 22 (e.g., an alternator) to operate the TCCU 14. In some embodiments, the truck 11 can be a hybrid vehicle that is powered by the prime mover 21 in combination with a battery power source or can be an electrically driven truck in which the prime mover 21 is replaced with an electric power source (e.g., a battery power source). In some embodiments, the TCCU 14 can have its own independent power source (e.g., a TCCU prime mover, a TCCU alternator, a TCCU battery power source, etc.) that is separate from the prime mover 21 to provide power to and operate the TCCU 14. A TCCU prime mover can power the TCCU 14 by itself or in combination with a TCCU alternator or the optional machine 22 or a TCCU battery power source. In some embodiments, the TCCU 14 can be powered by a TCCU electric power source (e.g., a battery power source) without the use of a prime mover (e.g., the prime mover 21, a TCCU prime mover, etc.).

While FIG. 1A illustrates a temperature-controlled straight truck 11, it will be appreciated that the embodiments described herein can also apply to any other type of transport unit (TU) including, but not limited to, a container (such as a container on a flat car, an intermodal container, etc.), a box car, or other similar transport unit. container, etc.), a box car, or other similar transport unit.

Figure 1B:
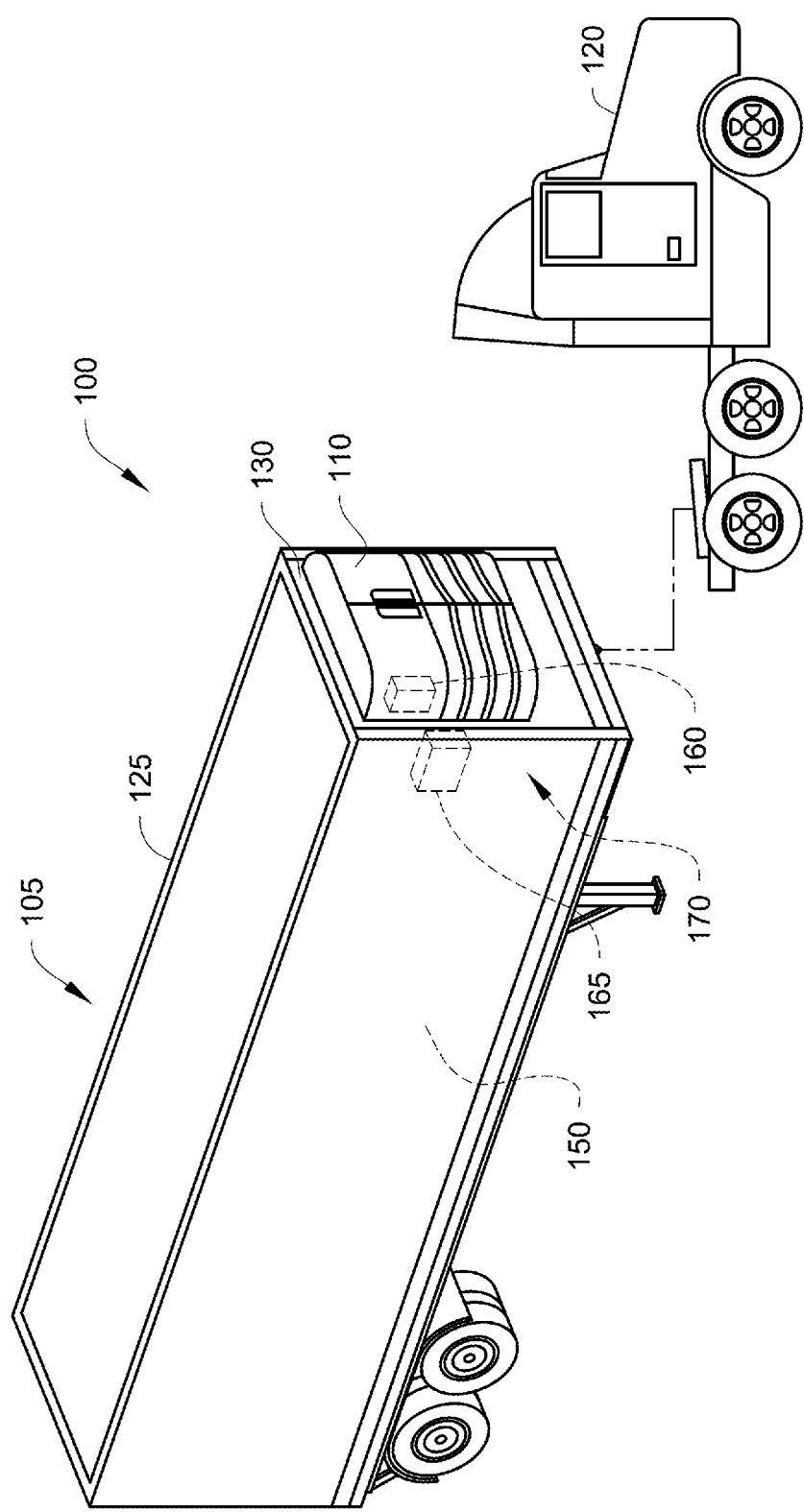
FIG. 1B illustrates a perspective view of a refrigerated transport unit attached to a tractor, according to one embodiment.

FIG. 1B illustrates one embodiment of a refrigerated transport unit 105 attached to a tractor 120. The refrigerated transport unit 105 includes a transport climate control system 100 for a transport unit 125. The tractor 120 is attached to and is configured to tow the transport unit 125. The transport unit 125 shown in FIG. 1B is a trailer. It will be appreciated that the embodiments described herein are not limited to tractor and trailer units, but can apply to any type of transport unit (e.g., a container on a flat car, an intermodal container, etc.), a truck, a box car, or other similar transport unit. The transport unit 125 can include one or more doors (not shown) that are movable between an open position and a closed position to selectively allow access to a climate controlled space (e.g., internal or cargo space) 150.

The transport climate control system 100 includes a climate control unit (CCU) 110 that provides environmental control (e.g. temperature, humidity, air quality, etc.) within the climate controlled space 150 of the transport unit 125. The climate control system 100 also includes a programmable climate controller 170 and one or more sensors (not shown) that are configured to measure one or more parameters of the climate control system 100 and communicate parameter data to the climate controller 170.

The CCU 110 is disposed on a front wall 130 of the transport unit 125. In other embodiments, it will be appreciated that the CCU 110 can be disposed, for example, on a rooftop or another wall of the transport unit 125. The CCU 110 includes a transport climate control circuit that connects, for example, a compressor, a condenser, an evaporator and an expansion valve and includes at least two fans and a damper to provide conditioned air within the climate controlled space 150.

The climate controller 170 may comprise a single integrated control unit 160 or may comprise a distributed network of climate controller elements 160, 165, which includes the control unit. The number of distributed control elements in a given network can depend upon the particular application of the principles described herein. The climate controller 170 is configured to control operation of the climate control system 100 including the transport climate control circuit.

Figure 1C:
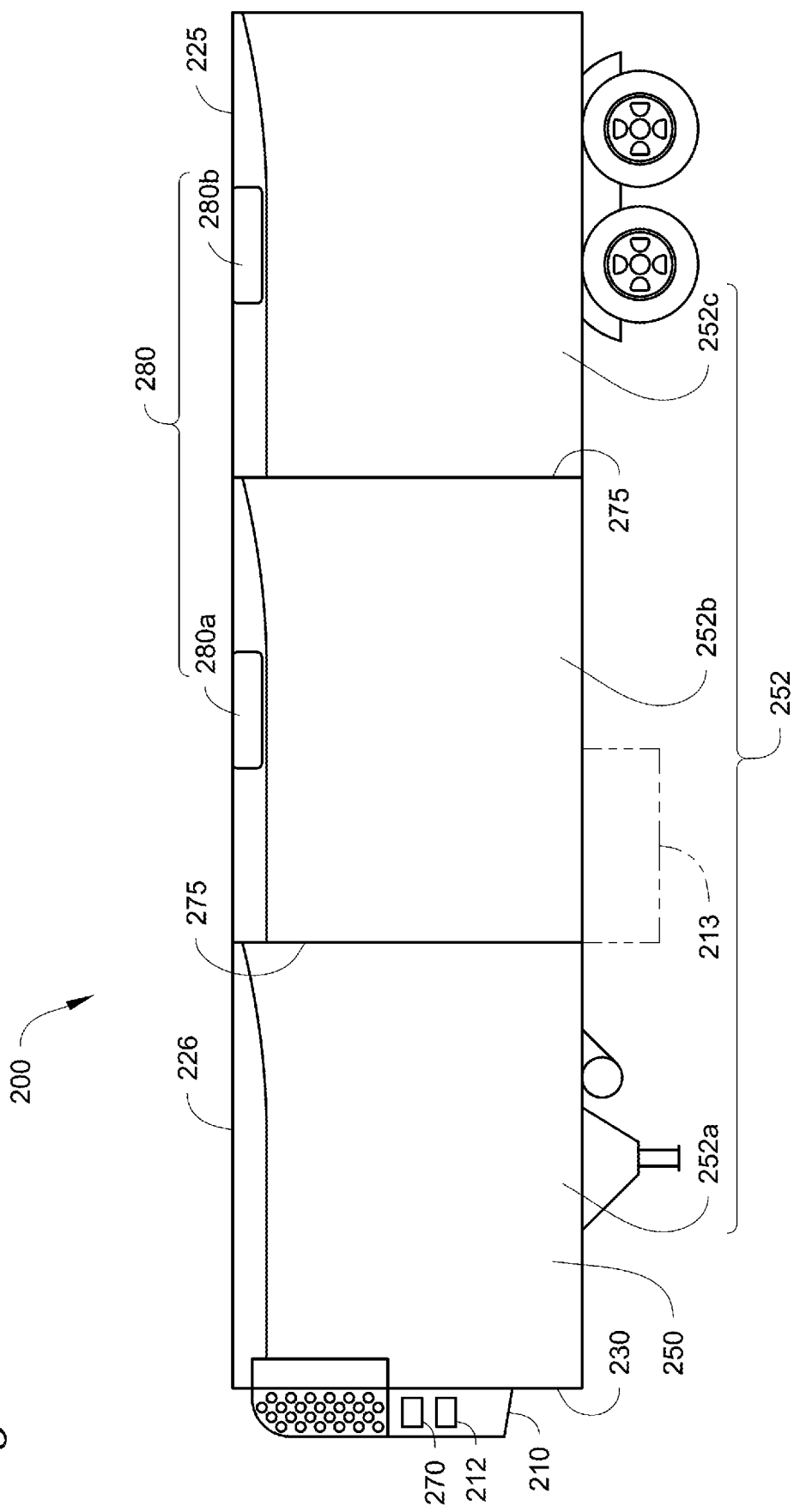
FIG. 1C illustrates a schematic cross sectional side view of a refrigerated transport unit with a multi-temp transport climate control system, according to an embodiment.

FIG. 1C illustrates one embodiment of a multi-zone transport climate control system (MCCS) 200 for a transport unit (TU) 225 that can be towed, for example, by a tractor (not shown). The MCCS 200 includes a transport climate control unit (TCCU) 210 that provides environmental control (e.g. temperature, humidity, air quality, etc.) within an internal climate controlled space 250 of the TU 225. The MCCS 200 also includes a MCCS controller 270 and one or more sensors (e.g., Hall effect sensors, current transducers, etc.) that are configured to measure one or more parameters (e.g., ambient temperature, compressor suction pressure, compressor discharge pressure, supply air temperature, return air temperature, humidity, etc.) of the MCCS 200 and communicate parameter data to the MCCS controller 270. The MCCS 200 is powered by a power module 212. The TCCU 210 is disposed on a front wall 230 of the TU 225. In other embodiments, it will be appreciated that the TCCU 210 can be disposed, for example, on a rooftop 226 or another wall of the TU 225.

In some embodiments, the MCCS 200 can include an undermount unit 213. In some embodiments, the undermount unit 213 can be a TCCU that can also provide environmental control (e.g. temperature, humidity, air quality, etc.) within the internal climate controlled space 250 of the TU 225. The undermount unit 213 can work in combination with the TCCU 210 to provide redundancy or can replace the TCCU 210. Also, in some embodiments, the undermount unit 213 can be a power module that includes, for example, a generator that can help power the TCCU 210.

The programmable MCCS Controller 270 may comprise a single integrated control unit or may comprise a distributed network of control elements. The number of distributed control elements in a given network can depend upon the particular application of the principles described herein. The MCCS controller 270 is configured to control operation of the MCCS 200.

As shown in FIG. 1C, the power module 212 is disposed in the TCCU 210. In other embodiments, the power module 212 can be separate from the TCCU 210. Also, in some embodiments, the power module 212 can include two or more different power sources disposed within or outside of the TCCU 210. In some embodiments, the power module 212 can include one or more of a prime mover, a battery, an alternator, a generator, a solar panel, a fuel cell, etc. Also, the prime mover can be a combustion engine or a microturbine engine and can operate as a two speed prime mover, a variable speed prime mover, etc. The power module 212 can provide power to, for example, the MCCS Controller 270, a compressor (not shown), a plurality of DC (Direct Current) components (not shown), a power management unit (not shown), etc. The DC components can be accessories or components of the MCCS 200 that require DC power to operate. Examples of the DC components can include, for example, DC fan motor(s) for a condenser fan or an evaporator blower (e.g., an Electrically Commutated Motor (ECM), a Brushless DC Motor (BLDC), etc.), a fuel pump, a drain tube heater, solenoid valves (e.g., controller pulsed control valves), etc.

The power module 212 can include a DC power source (not shown) for providing DC electrical power to the plurality of DC components (not shown), the power management unit (not shown), etc. The DC power source can receive mechanical and/or electrical power from, for example, a utility power source (e.g., Utility power, etc.), a prime mover (e.g., a combustion engine such as a diesel engine, etc.) coupled with a generator machine (e.g., a belt-driven alternator, a direct drive generator, etc.), a series of battery sources, etc. For example, in some embodiments, mechanical energy generated by a diesel engine is converted into electrical energy via a generator machine. The electrical energy generated via the belt driven alternator is then converted into DC electrical power via, for example, a bi-directional voltage converter. The bi-directional voltage converter can be a bi-directional multi-battery voltage converter.

The internal climate controlled space 250 can be divided into a plurality of zones 252. The term "zone" means a part of an area of the internal climate controlled space 250 separated by walls 275. It will be appreciated that the invention disclosed herein can also be used in a single zone TCCU.

The MCCS 200 for the TU 225 includes the TCCU 210 and a plurality of remote evaporator units 280. In some embodiments, an HVAC system can be powered by an Auxiliary Power Unit. The APU can be operated when a main prime mover of the TU 225 is turned off such as, for example, when a driver parks the TU 225 for an extended period of time to rest. The APU can provide, for example, power to operate a secondary HVAC system to provide conditioned air to a cabin of the TU 225. The APU can also provide power to operate cabin accessories within the cabin such as a television, a microwave, a coffee maker, a refrigerator, etc. The APU can be a mechanically driven APU (e.g., prime mover driven) or an electrically driven APU (e.g., battery driven).

The tractor includes a vehicle electrical system for supplying electrical power to the electrical loads of the tractor, the MCCS 200, and/or the TU 225. In some embodiments, the tractor can include a compressor that can compress air and store the compressed air in compressor tank(s).

Figure 1D:
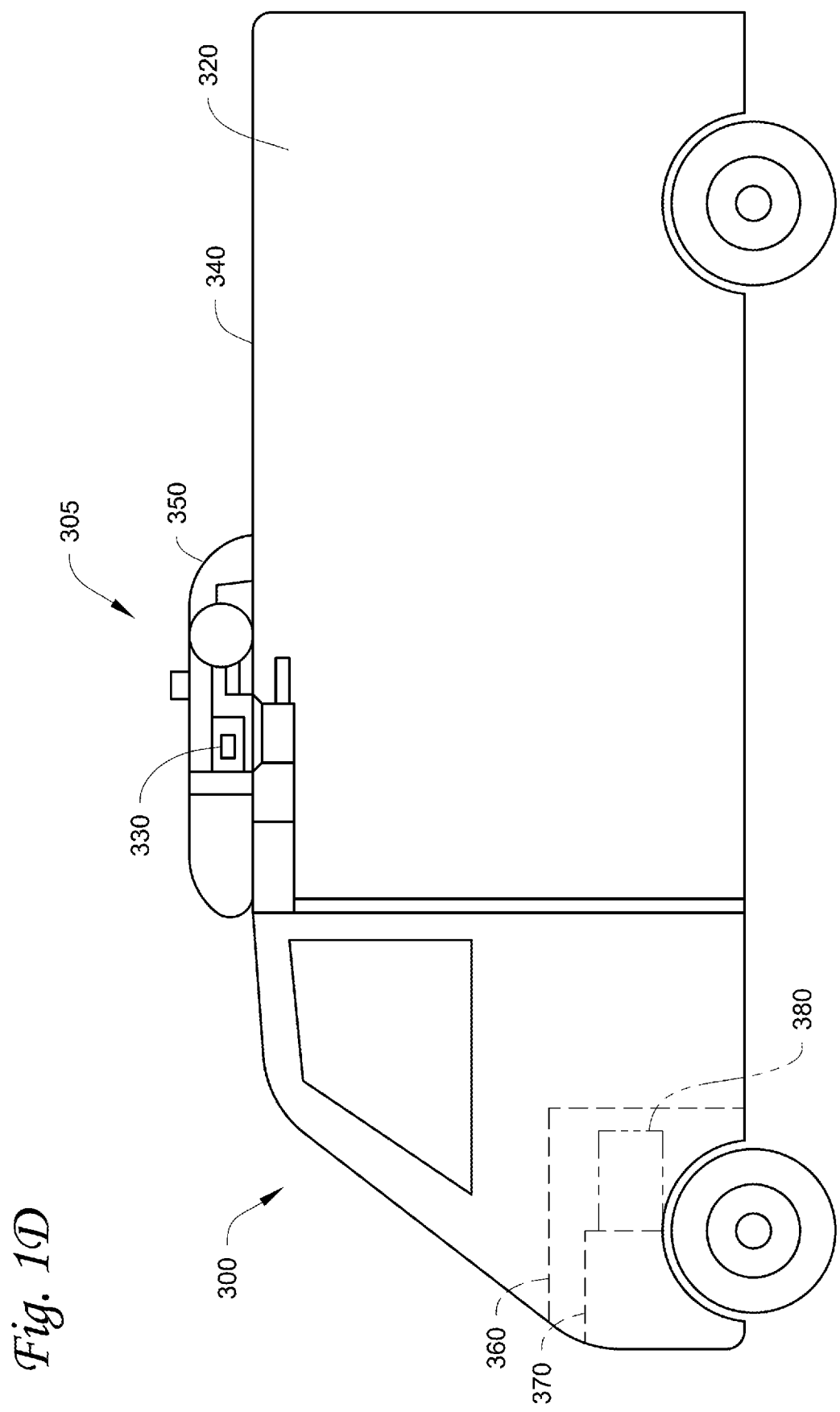
FIG. 1D illustrates a side view of a van with a roof mounted transport climate control unit, according to an embodiment.

FIG. 1D depicts a temperature-controlled van 300 that includes a climate controlled load space 320 (or internal space) for carrying cargo and a transport climate control system (TCCS) 305. The TCCS 305 includes a transport climate control unit (TCCU) 350 that is mounted to a rooftop 340 of the climate controlled load space 320. The TCCS 305 is controlled via a controller 330 to provide climate control within the climate controlled load space 320. The van 300 further includes a vehicle power bay 360, which houses a prime mover 370, such as a combustion engine (e.g., diesel engine, etc.) or battery power source, that provides power to move the van 300 and to operate the TCCS 305. In some embodiments, the prime mover 370 can work in combination with an optional machine 380 (e.g., an alternator) to operate the TCCU 350. In one embodiment, the van 300 includes a vehicle electrical system. Also, in some embodiments, the van 300 can be a hybrid vehicle that is powered by the prime mover 370 in combination with a battery power source or can be an electrically driven truck in which the prime mover 370 is replaced with an electric power source (e.g., a battery power source).

Figure 2:
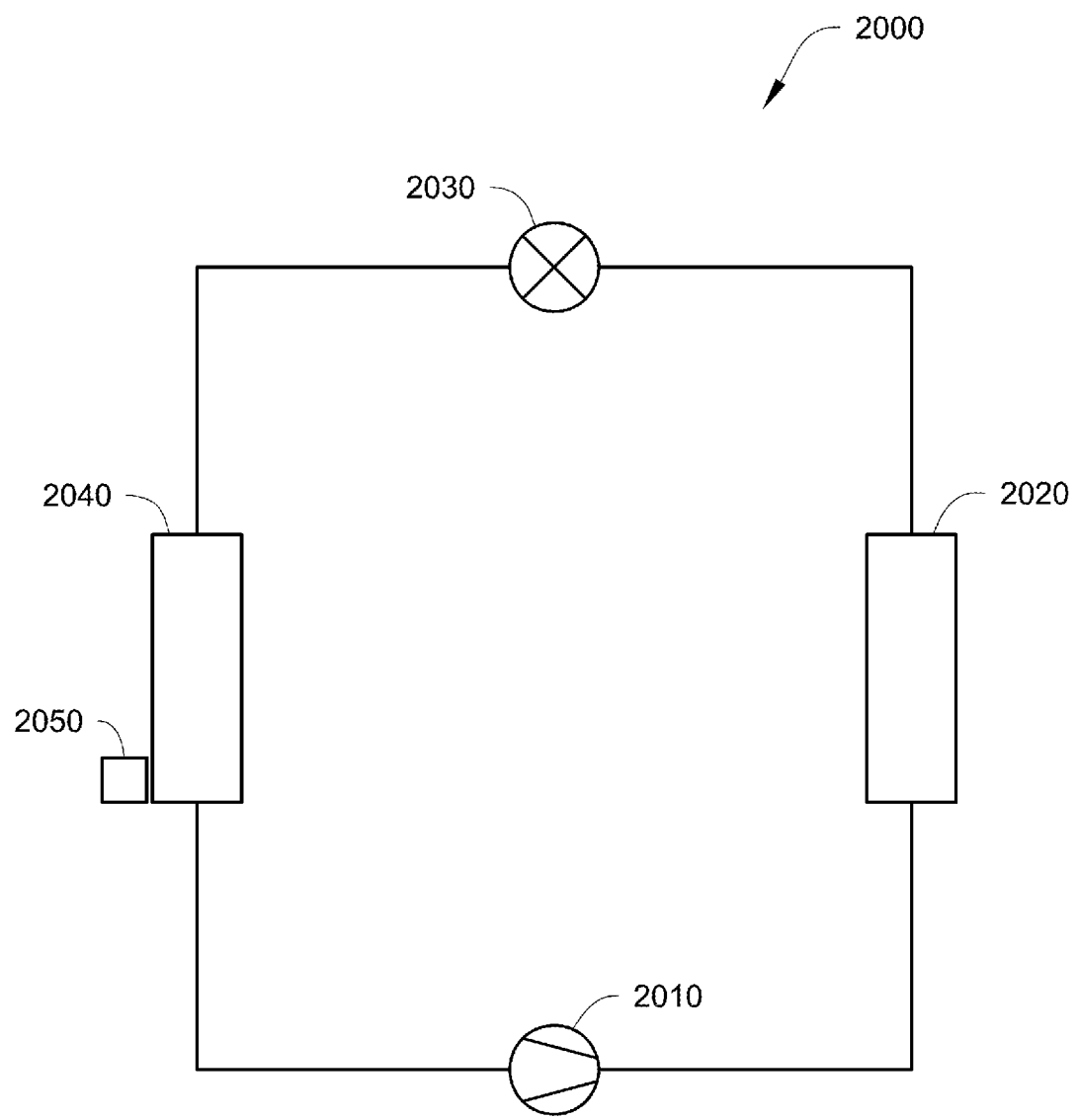
FIG. 2 illustrates a block diagram of a transport climate control circuit, according to one embodiment.

FIG. 2 illustrates a block diagram of a transport climate control circuit 2000, according to one embodiment that can be used in any of the above transport climate control systems shown in FIGS. 1A-D. The transport climate control circuit 2000 can be, for example, a circuit that can be used to provide climate control within a passenger space of a vehicle (e.g., the climate controlled space 320 shown in FIG. 1D), a circuit that can be used to provide climate control within an internal space or cargo space that is a climate controlled space of a transport unit (e.g., the climate controlled space 12, 150, 250, 320 shown in FIGS. 1A-D), etc. A working fluid (e.g., a refrigerant) is configured to pass through components of the transport climate control circuit 2000 to provide climate control within the internal space or cargo space.

The transport climate control circuit 2000 includes at least a compressor 2010, a condenser 2020, an expansion device 2030, an evaporator 2040, and a heating device 2050.

The compressor 2010 can be a digital scroll compressor, a reciprocating compressor, a screw compressor, a positive displacement compressor, a centrifugal compressor, or other suitable type of compressor for compressing a working fluid. A climate controller (e.g., the controller 15, 170, 270, 330 shown in FIGS. 1A, 1B, 1C, 1D) is configured to control the climate control circuit 2000 to operate in a plurality of different operation modes including, for example, a continuous cooling mode, a start-stop cooling mode, a heating mode, a defrost mode, etc.

Of particular note, in the continuous cooling mode, the climate controller is configured to instruct the compressor 2010 to continuously compress the working fluid until the temperature within the climate controlled space reaches a desired setpoint temperature. In the start-stop cooling mode, the climate controller is configured to instruct the compressor 2010 to operate in a periodic cycle in which during each cycle the compressor 2010 is configured to compress the working fluid for a first period of time and then the compressor 2010 is configured to stop compressing the working fluid for a second period of time. The compressor 2010 will continue to cycle between compressing the working fluid and not compressing the working fluid until the temperature within the climate controlled space reaches the desired setpoint temperature. In some embodiments, the compressor 2010 is configured to compress the working fluid and direct the compressed working fluid from the compressor 2010 to the condenser 2020 during the start portion and configured to not compress working fluid during the stop portion. In some embodiments, during the stop portion of the start-stop cooling mode fan(s) of the condenser 2020 and the evaporator 2040 are turned off and are not operating.

The compressor 2010 is configured to compress a working fluid (e.g., refrigerant) and direct the working fluid through the climate control circuit 2000 in order to provide temperature control within a climate controlled space. In particular, the compressor 2010 is configured to direct the compressed working fluid that is a gas to the condenser 2020.

The condenser 2020 can include a condenser coil (not shown) and one or more condenser fans. The condenser 2020 is configured to allow the working fluid, received from the compressor 2010, to transform from a gas to a liquid by releasing heat absorbed by the working fluid into the ambient environment outside of the climate controlled space. That is, the condenser 2020 is configured to cool and condense the working fluid. The condenser 2020 is configured to direct the liquid working fluid to the expansion device 2030.

The expansion device 2030 is configured to receive the working fluid in the form of a liquid from the condenser 2020 and is configured to restrict the flow of the working fluid in the form of a gas to the evaporator 2040. In some embodiments, the expansion device 2030 can be an expansion valve. The gaseous working fluid is directed by the expansion device 2030 to the evaporator 2040.

The evaporator 2040 can include an evaporator coil and two or more evaporator fans (described in detail below). The evaporator 2040 is configured to allow the working fluid, received from the expansion device 2030, to evaporate from a liquid to a gas by absorbing heat from the climate controlled space and thereby provide cooling to the climate controlled space.

The transport climate control circuit 2000 can also include a heating device 2050 that can provide thermal energy for defrosting the evaporator 2040 or heat during the heating mode. This can allow for increased flexibility in defrost operation, such as, during frequent door openings of the climate controlled space (e.g., also referred to as door opening events). In some embodiments, the heating device 2050 can be an electric heating device that uses heating coils or an electric heater having an electrical resistor that converts electricity to heat and/or an electric heating bar that is able to generate heat and/or includes a heating fin connected to the electric heating device, electric heater, or electric heating bar to conduct heat from the heating source to evenly distribute the supply of heat in the evaporator by having an increased area to increase the rate of heat transfer. In some embodiments, the heating device 2050 can operate between 200 V DC and 2000 V DC, and preferably, between 330 V to 450 V DC, and nominally at 400 V DC, but it is appreciated that the electric heating device can be operated based on AC or DC voltage based on the specific unit/design of the electric heating device and/or at the voltage range for the operation of the transport unit. Also, in some embodiments, the discharge from the compressor 2010 having the compressed working fluid can be connected to the heating device 2050 (and optionally also including an electric heating element) to provide thermal energy to the evaporator 2040 in order to provide heating to the climate controlled space and/or the evaporator. It is appreciated that other heat sources can be used for providing heat to the heating device 2050, for example, a thermal storage system that uses brine or phase change material for capturing heat from the transport climate control circuit or other heating source from the transport unit, e.g., oil, exhaust, etc.

Figure 3A:
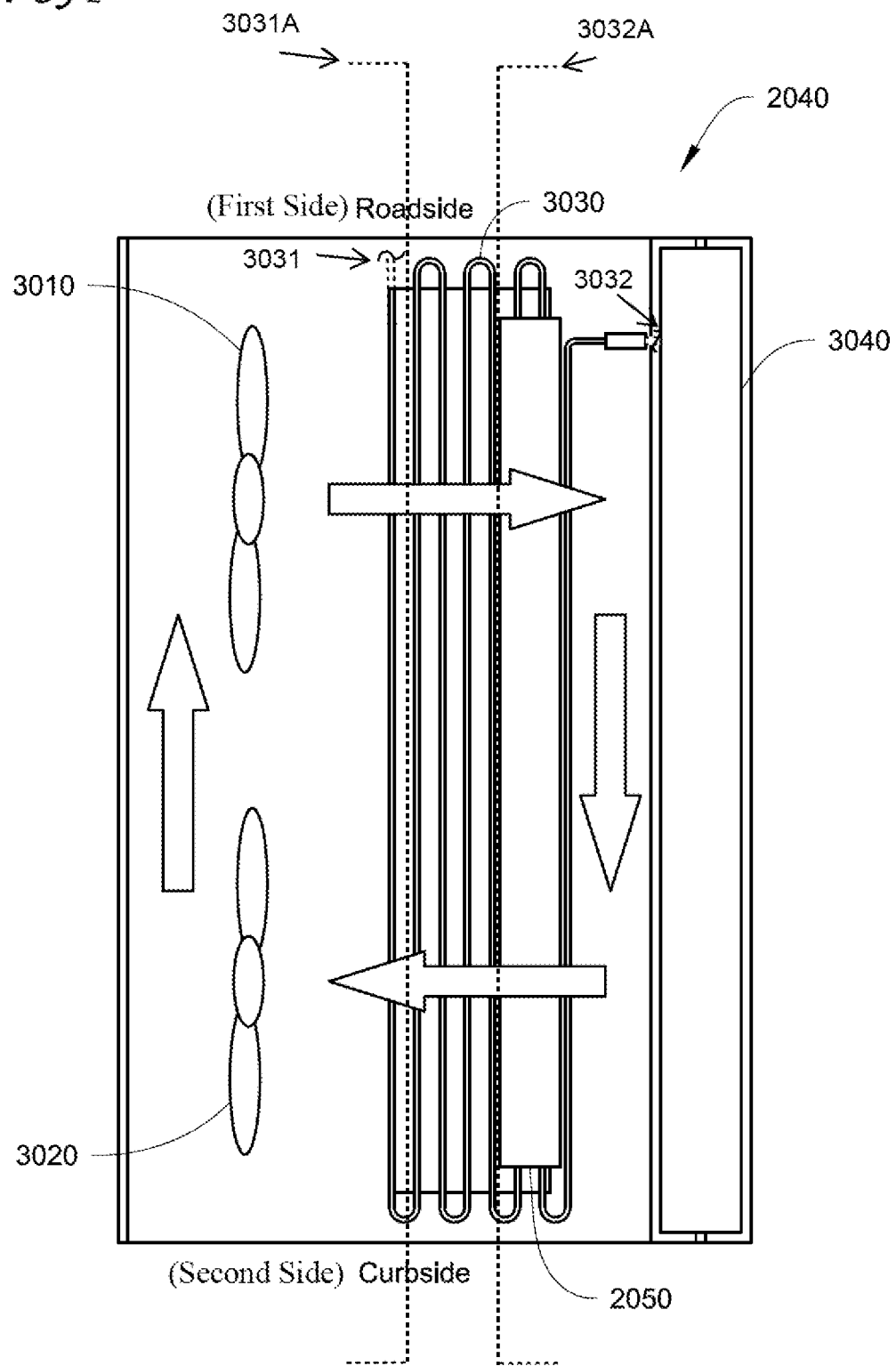
FIGS. 3A, 3B, and 3C illustrate a schematic view of an evaporator used in a transport climate control system, according to one embodiment.
Figure 3B:
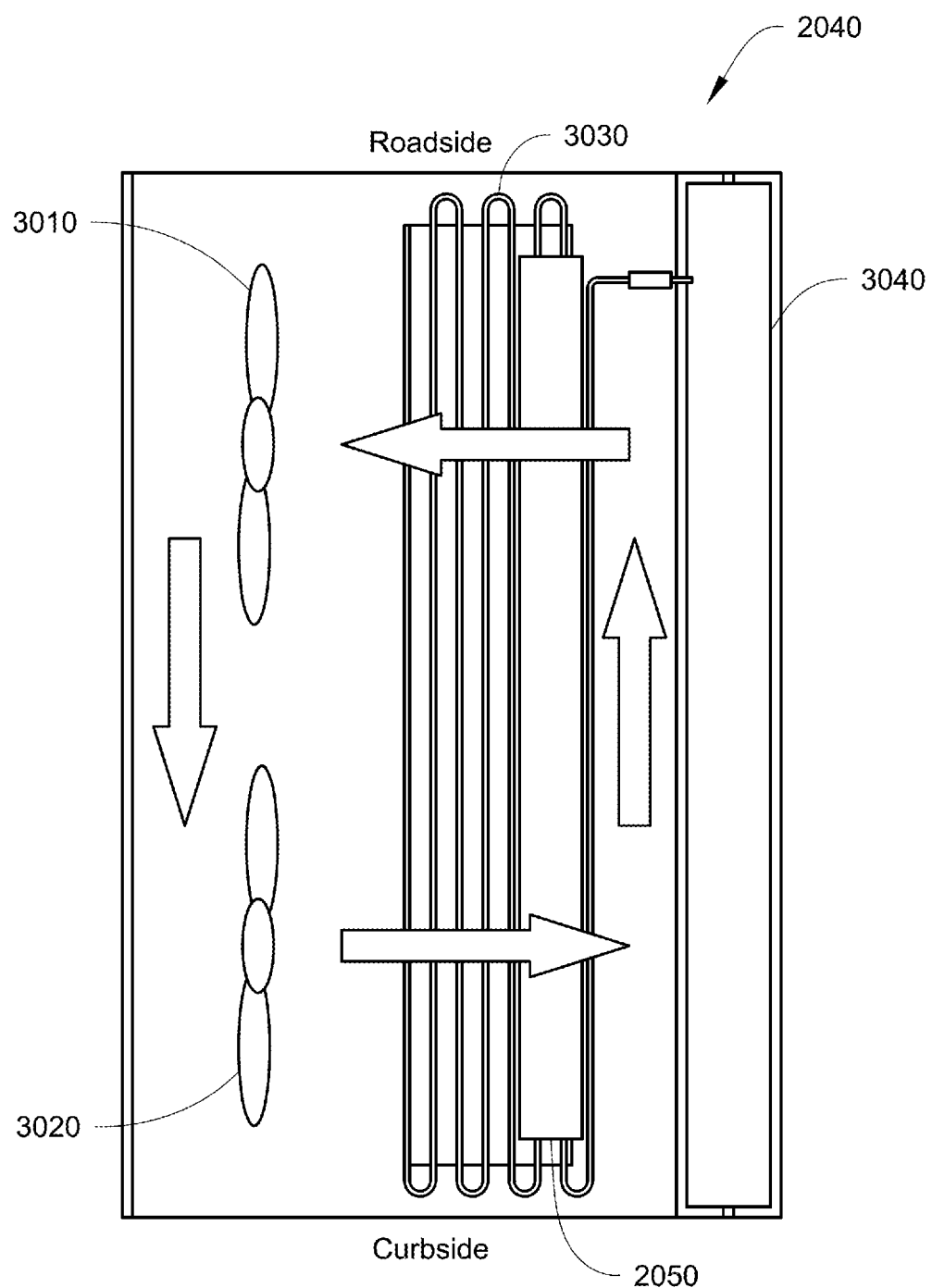
Figure 3C:
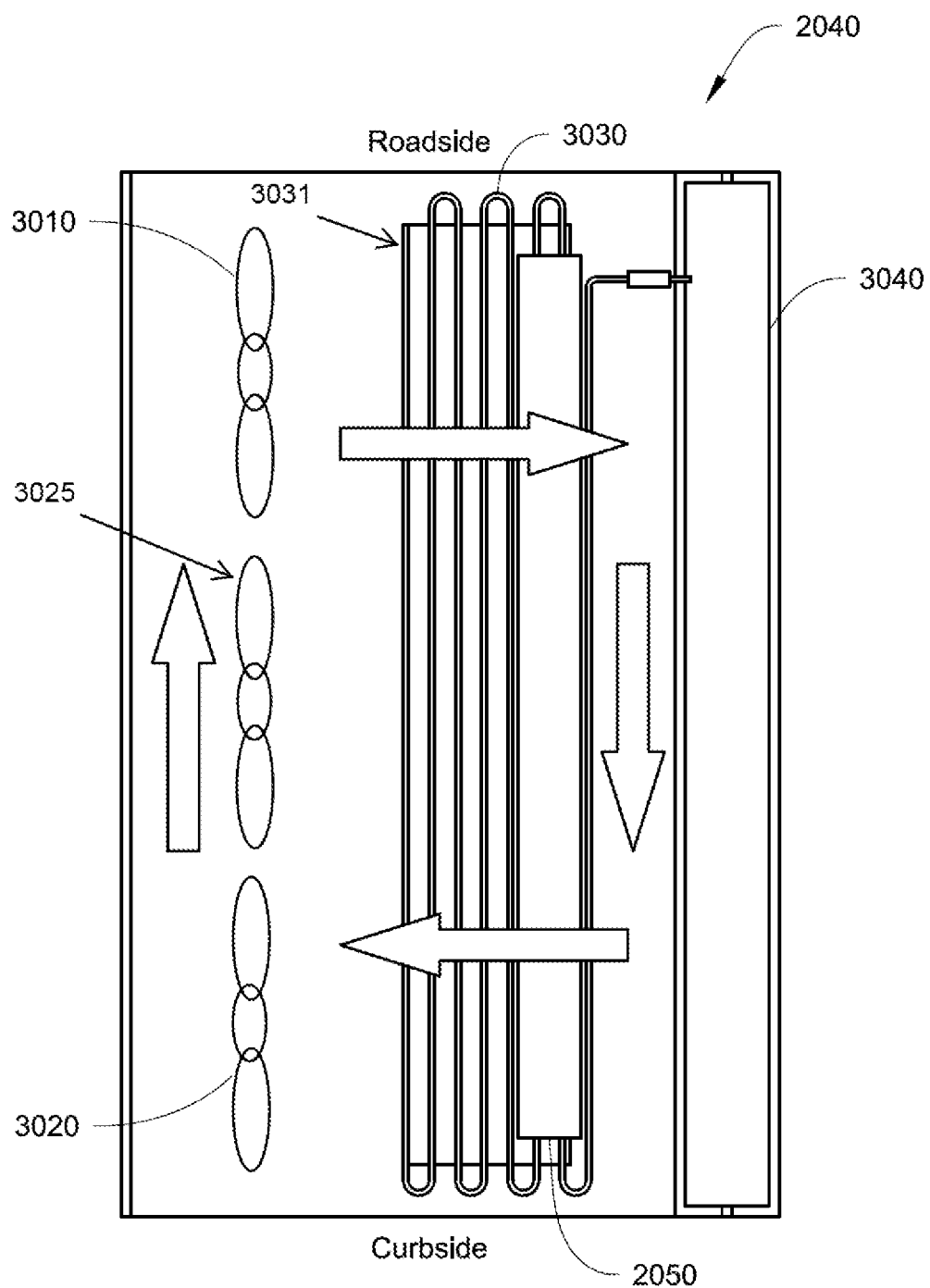

FIGS. 3A, 3B, and 3C illustrate the evaporator 2040 in further detail, according to example embodiments. The evaporator 2040 is used to absorb heat from the climate controlled space and evaporate the working fluid. The evaporator 2040 includes at least one evaporator coil having an inlet and outlet for receiving and returning the working fluid, at least two evaporator fans that control air flow around the evaporator coil, and at least one damper that moves between at least an open position and a closed position to control an amount of the air flow between the evaporator and the climate controlled space. Optionally, the transport climate control circuit 2000 can also include the heating device 2050 to defrost the evaporator coil or provide heat during the heating mode and a controller to control the transport control circuit 2000, as necessary.

The at least two evaporator fans can include a roadside evaporator fan 3010, e.g., fan nearer the middle/inner side of the road on which the transport unit is driven, e.g., a first side, and a curbside evaporator fan 3020, e.g., fan nearer the curb or outer side of the road on which the transport unit is driven, e.g., a second side. The at least two evaporator fans are used to control the air flow around specific sections of the evaporator coil, as described below. Additional evaporator fans can be used to control the amount of air flow around the evaporator coil, where the amount of evaporator fans are not limited hereto, but can be provided as required to meet the operating conditions of the transport climate control system. For example, as seen in FIG. 3C, a third evaporator fan 3025 can be provided between the roadside evaporator fan and the curbside evaporator fan, where the third evaporator fan 3025 would be used to further selectively control the air flow around specific parts of the evaporator coil for controlled cooling and/or heating.

The at least one evaporator coil can be a single evaporator coil 3030 that receives the working fluid from the expansion device at an inlet 3031 thereof, which is then evaporated by absorbing heat from the climate controlled space, and returns the working fluid to the compressor at the exit 3032 on an outlet side 3032A of the evaporator coil to continue the working fluid cycle. The at least one evaporator coil has sections or parts associated with the at least two evaporator fans for selective control of the air flow and can include at least a curbside section (or the second side) of the evaporator coil and at least a roadside section (or the first side) of the evaporator coil, which correspond to the same side as the roadside evaporator fan 3010 and the curbside evaporator fan 3020, respectively. It is understood that the evaporator coil can be a single coil having an inlet(s) 3031 closest to the evaporator fans at an inlet side 3031A, multiple inlets along various sections of the evaporator coil, or the evaporator coil can be multiple separate evaporator coils connected along different flows paths in the evaporator with or without dividers, e.g., to provide different cooling profiles across the evaporator.

The heating device 2050 can be controlled, for example, by the climate controller and can be connected to a high voltage power source, e.g., electric vehicle battery or battery charged from movement of a prime mover, or can be connected to another heat source, e.g., discharge outlet of the compressor or thermal storage system, for providing heat to the evaporator. The heating device can be heated, for example to have a surface temperature, between 200° F. and 800° F., and preferably between 350° F. and 500° F., and most preferably below 400° F. or similar temperature range that is sufficient to defrost the evaporator coil.

Operation of the transport climate control circuit 2000 is described below with respect to FIG. 4.

Figure 4:
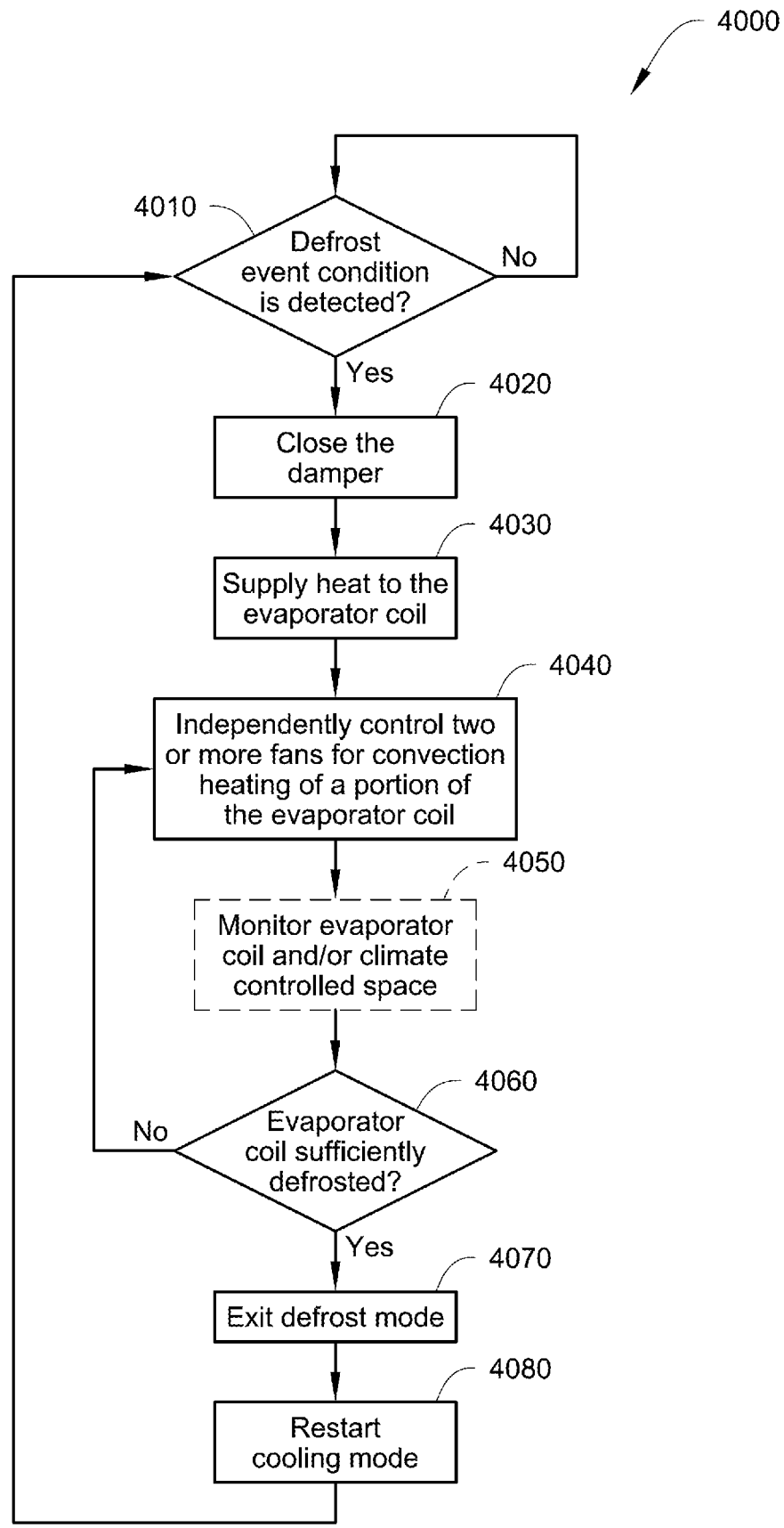
FIG. 4 illustrates a flowchart of a method for providing thermal energy to the evaporator of the transport climate control circuit shown in FIG. 2, according to one embodiment.

FIG. 4 illustrates a flowchart for a method 4000 for providing thermal energy to the evaporator 2040 of the climate control circuit 2000 shown in FIG. 2, according to one embodiment.

The method 4000 begins at 4010 whereby a controller (e.g., the climate controller 15, 170, 270, 330 shown in FIGS. 1A-1D) determines whether a defrost event condition is detected/occurs in the transport climate control circuit 2000. For example, the defrost event condition can be: a door opening event; a time condition, (e.g., every two minutes or every two hours, etc.); or based on pressure, temperature, and/or humidity data from sensors, or a combination thereof. When the controller determines that a defrost event is triggered in the transport climate control circuit 2000, the method 4000 proceeds to 4020, which can be an automatic event to defrost the evaporator coil or require user selection of the defrost mode. When the controller determines that a defrost event is not triggered in the transport climate control circuit 2000, the method 4000 continues to loop until a defrost event is triggered.

At 4020, the controller begins operating in a defrost mode and closes the damper 3040 that separates the evaporator from the climate controlled space of a transport unit. In some embodiments, the controller can operate a solenoid coupled to the damper. Additionally, a valve (not shown in this embodiment) in the transport climate control circuit can be closed, preventing cold working fluid from flowing into the evaporator coil. The method 4000 then proceeds to 4030.

At 4030, the controller can defrost the evaporator coil by instructing the transport climate control circuit to supply heat to or around at least one section of the evaporator coil based on, among other things, mass of the ice/frost, size of the coil, airflow, etc. For example, the controller can control the heating device, e.g., an electric heating device, to supply the marketing requested heat capacity for the heating device that is sufficient to perform defrost to heat around one section of the evaporator coil, e.g., by turning on the electric heating device to a specified temperature to generate heat, where the specified temperature is between 200° F. and 800° F., and preferably between 350° F. to 500° F., and most preferably at or below 400° F. It is appreciated that other heating sources can be optionally used to supply heat for defrosting the evaporator coil. For example, since the discharge temperature of the working fluid of the compressor is typically between 150-265° F. the discharge of the compressor can also be used as the heating source of the heating device, where the controller instructs the transport climate control circuit to supply heat to or around one section of the evaporator by instructing the transport climate control circuit to direct hot gas from the compressor to the evaporator coil. Similarly, a thermal energy storage system can be used as the heat source, since such system captures heat from the working fluid for later reuse. It is appreciated that during the defrosting, the heat can be supplied solely by the electric heating device, e.g., without using the hot gas from the compressor discharge during defrosting, or in conjunction with the hot gas from the compressor through the evaporator coil. The method 4000 then proceeds to 4040.

At 4040, the controller independently controls two or more evaporator fans, e.g., evaporator fans 3010, 3020 in FIG. 3A, of the climate control circuit 2000 to convectively heat different portions or sections of the evaporator coil, i.e., so that heat from one section of the evaporator coil is used to heat and defrost the frost formed at a different portion or section of the evaporator coil. For example, as illustrated in FIGS. 3A and 3B, the controller independently controls operation of the evaporator fan to move air around the evaporator coil in a first controlled direction A, e.g., clockwise direction, so that the air is moved from an inlet of the evaporator coil to an exit or outlet of the evaporator coil along different sections of the evaporator coil, e.g., so that heat from the one section of the evaporator coil is used to convectively defrost frost formed at the inlet of the evaporator coil. For example, FIG. 3A illustrates the operation of a first (or roadside) evaporator fan 3010, which draws air from the evaporator and forces the air across a first section (or roadside section) of the evaporator coil 3030 at an inlet of the evaporator coil at the roadside section of the evaporator coil and then across the roadside section of the evaporator coil and the heating device 2050. The air is then moved from around the exit/outlet of the evaporator coil and heating device across a second section (or curbside section) of the evaporator coil at the curbside section of the evaporator coil towards the inlet of the evaporator coil at the curbside section. In so doing, frost formed at the inlet of the curbside section of the evaporator coil is defrosted by convection heating. It is appreciated that the evaporator fans can be controlled at various speeds depending on the conditions necessary for defrost. That is, the evaporator fans can be run at a low speed, middle speed, or high speed, or combinations thereof for defrosting the evaporator coil.

The controller can then stop the first evaporator fan 3010 and start the second (or curbside) evaporator fan 3020 as seen in FIG. 3B. The second evaporator fan 3020 moves air around the evaporator coil in a second controlled direction B, e.g., counterclockwise direction, where air is moved from the inlet of the evaporator coil to the exit or outlet of the evaporator coil along different sections of the evaporator coil. For example, the second evaporator fan 3020 draws air from the evaporator and moves the air across the second section of the evaporator coil 3030 at the inlet of the evaporator coil at the curbside section of the evaporator coil and then across the curbside section of the evaporator coil and the heating device 2050. The air is then forced from the exit/outlet of the evaporator coil across the first section of the evaporator coil at roadside section of the evaporator coil towards the inlet of the evaporator coil at the roadside section. In so doing, frost formed at the inlet of the first section/roadside section of the evaporator coil is defrosted by convection heating.

It is appreciated that the controller can also control the evaporator fans in a positive air flow direction, where air is blown towards the evaporator coil, and in a negative air flow direction, where air is drawn from the evaporator coil to provide desired convection heating around the evaporator coil. In so doing, in one embodiment, during the defrost mode, the controller can control the operation of the curbside evaporator fan 3020 nearer the curbside section of the evaporator coil so that air is first drawn across the heating device 2050 and the exit/outlet of the evaporator coil at the curbside section of the evaporator coil so that the heated air is used to defrost the inlet of the evaporator coil at the curbside section of the evaporator coil, e.g., the evaporator coil on the same side as the evaporator fan.

It is further appreciated that while the controller controls one of the two or more evaporator fans and stops the second or other fans, so that less static pressure is built up in the evaporator, in some embodiments, both fans can be operated at the same time, but in opposite directions. For example, the first/roadside evaporator fan can be controlled to blow air in the positive air flow direction towards the roadside section of the evaporator coil, while the second/curbside evaporator fan is controlled in the negative air flow direction to draw air from curbside section of the evaporator coil. In this way, a greater air flow can be generated to convectively heat the evaporator. The method then optionally proceeds to 4050.

At 4050, the controller can optionally monitor parameters or conditions in the evaporator using sensors on or around the evaporator coil and/or in the climate controlled space to monitor at least one of temperature, pressure, or humidity, or combination thereof. In some embodiments, monitoring the evaporator coil can include monitoring a temperature difference across the evaporator coil. For example, in one embodiment, one or more temperature sensors can be provided on the evaporator coil that provide evaporator coil temperature data across the evaporator coil. In another embodiment, one or more pressure sensors can be provided for providing pressure data across the evaporator coil. In some embodiments, monitoring the climate controlled space can include monitoring door openings of doors that access the climate controlled space (also referred to as door opening events), monitoring a temperature within the climate controlled space, etc. The method then proceeds to 4060.

At 4060, the controller determines whether or not the evaporator coil is sufficiently defrosted, e.g., by using the above mentioned sensors as discussed with respect to optional 4050. It is appreciated that while the determination of whether or not the evaporator coil is sufficiently defrosted can be based on sensors indicating that frost is still formed on the evaporator coil, it is understood that the evaporator fans can be started based on monitored/detected events or a programmed time, e.g., every two hours, or manually operated. If the evaporator coil is not sufficiently defrosted, the method returns to 4040 to independently control the two or more fans to continue the convection heating of the evaporator coil. Based on the conditions in the evaporator, the controller can then determine which of the evaporator fans should be running to defrost the evaporator coil, e.g., a temperature at the inlet of the roadside section of the evaporator coil is low, while the adjacent section of the evaporator coil at the curbside section of the evaporator coil does not indicate signs of frost formation, then the curbside evaporator would be run. When the evaporator coil is sufficiently defrosted, the method proceeds to 4070.

At 4070, the controller exits the defrost mode and proceeds to 4080 to restart the previous operating mode (e.g., a continuous cooling mode, a start-stop cooling mode, a heating mode, etc.) and returns to 4010 to wait for the next defrost event to occur.

Accordingly, the method 4000 can provide heating energy that is efficient in defrosting the evaporator. Reducing total energy consumption and/or time by the transport climate control system can be important particularly for those transport climate control systems that rely on battery power for operations. This is because, for example, the energy storage can be expensive, heavy, and/or take valuable space of the transport vehicle. An advantage of these embodiments is that the transport climate control system can provide defrost to the evaporator coil without requiring additional energy to generate heat to remove any frost buildup.

It is appreciated that while the above disclosure is described with respect to the cooling mode being off, the defrosting mode can be used while the transport climate control system is providing cooling to improve cooling efficiency of the transport climate control system as a frosted evaporator coil can lower capacity and efficiency of the transport climate control system during cooling.

Figure 5:
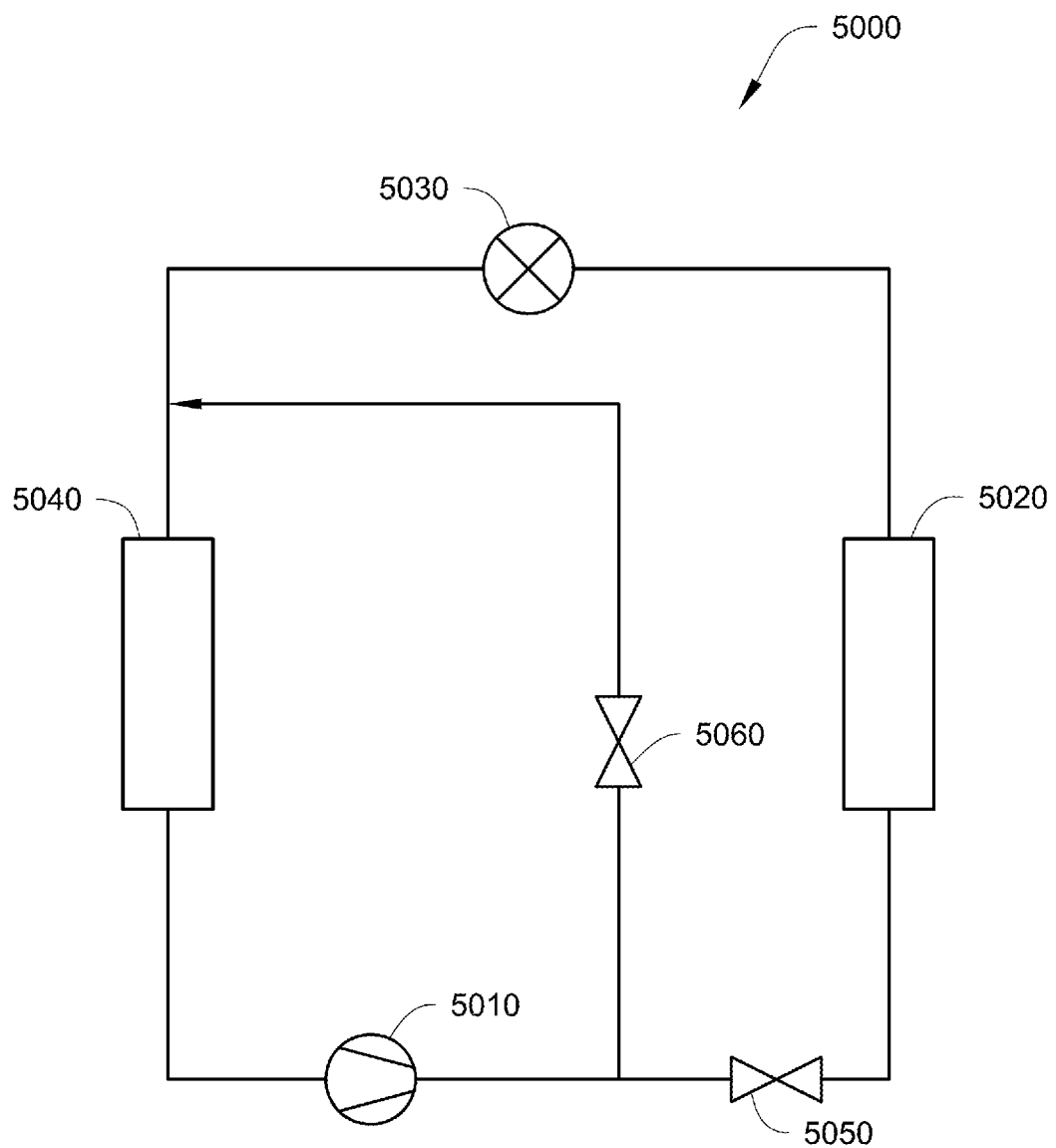
FIG. 5 illustrates a block diagram of a transport climate control circuit, according to another embodiment.

FIG. 5 illustrates a block diagram of a transport climate control circuit 2000, according to another embodiment of the invention, having similar elements to FIG. 2, but where a heating device is not provided in the evaporator. Instead, hot gas from the compressor is used to defrost the evaporator. The transport climate control circuit 5000 includes at least a compressor 5010, a condenser 5020, an expansion device 5030, and an evaporator 5040.

In this embodiment, during the defrost mode, the first valve 5050 which is provided between the exit of the compressor 5010 and the condenser 5020 can be closed, either manually or automatically by the controller. The second valve 5060 can then be opened to circulate the hot gas from the compressor discharge to the inlet of the evaporator coil of the evaporator 5040. It is appreciated that the hot gas can be provided at different sections of the evaporator coil, e.g., multiple or different inlets to the evaporator coil, along different sections of the evaporator coil using valves, or at the exit/outlet of the evaporator coil and/or the different sections of the evaporator can be divided using dividers. In so doing, the hot gas is not used to directly heat the frost formation on the evaporator coil, which typically occurs at the inlet of the evaporator coil, but can be used with the evaporator fans, as discussed above, so that convective heating of the evaporator can occur by the independent control of the evaporator fans to move the air around the evaporator coil in controlled directions so that heat from one section of the evaporator coil is used to convectively defrost the frost formed on the evaporator coil.

Aspects:

It is to be appreciated that any of aspects 1-9 can be combined with any of aspects 10-15 or the embodiments discussed above.

Aspect 1. A transport climate control system for providing climate control to a climate controlled space of a transport unit, the transport climate control system comprising:
   a transport climate control circuit comprising:
      a compressor that compresses a working fluid passing through the transport climate control circuit,
      an evaporator that absorbs heat from the climate controlled space and evaporates the working fluid, said evaporator comprising an evaporator coil having an inlet for receiving the working fluid, at least two fans that control air flow around the evaporator coil of the evaporator, and a controller configured to control the transport climate control circuit and configured to defrost the evaporator coil by:
  instructing the transport climate control circuit to supply heat to or around one section of the evaporator coil, and
  independently controlling each of the at least two fans to move the air around the evaporator coil in controlled directions so that heat from the one section of the evaporator coil is used to convectively heat the inlet of the evaporator coil.

Aspect 2. The transport climate control system of aspect 1, further comprising a damper that moves between at least an open position and a closed position to control an amount of the air flow between the evaporator and the climate controlled space, wherein the controller is further configured to: close the damper when a defrost event is triggered.

Aspect 3. The transport climate control system of any one of aspects 1 and 2, further comprising an electric heating device that is disposed adjacent to the evaporator coil and configured to generate heat, wherein instructing the transport climate control circuit to supply heat to or around the one section of the evaporator coil includes the controller turning on the electric heating device to generate heat.

Aspect 4. The transport climate control system of aspect 3, wherein the electric heating device is positioned at an outlet of the evaporator coil.

Aspect 5. The transport climate control system of any one of aspects 3 or 4, wherein the electric heating device is positioned at the inlet of the evaporator coil.

Aspect 6. The transport climate control system of any one of aspects 1-5, wherein instructing the transport climate control circuit to supply heat to or around the one section of the evaporator coil includes instructing the transport climate control circuit to direct hot gas from the compressor to the evaporator coil.

Aspect 7. The transport climate control system of any one of aspects 1 to 6, further comprising a heating fin configured to evenly distribute the heat from the supply of heat along the evaporator coil.

Aspect 8. The transport climate control system of any one of aspects 1 to 7, wherein the at least two fans are each configured to operate in a positive air flow direction and a negative air flow direction.

Aspect 9. The transport climate control system of any one of aspects 1 to 8, wherein at least a third fan is provided to further control air flow around the evaporator coil of the evaporator.

Aspect 10. The transport climate control system of any one of aspects 1 to 9, wherein the controller is configured to monitor the evaporator coil of the evaporator by monitoring at least one of evaporator coil temperature data and evaporator pressure data across the evaporator coil and automatically defrost the evaporator coil when the defrost event is triggered.

Aspect 11. A method for defrosting an evaporator of a transport climate control circuit of a transport climate control system that provides climate control to a climate controlled space of a transport unit, the transport climate control circuit including a compressor, an evaporator that includes an evaporator coil having an inlet for receiving the working fluid, and at least two fans, the method comprising:
  a controller of the transport climate control system detecting a defrost event condition;
  upon detecting the defrost event condition:
    supplying heat to or around one section of the evaporator coil;
    independently controlling a first fan of the at least two fans to move air around the evaporator coil in a first controlled direction so that heat from the one section of the evaporator coil is used to convectively heat a first side of the inlet of the evaporator coil, and
    independently controlling a second fan of the at least two fans to move air around the evaporator coil in a second controlled direction so that heat from the one section of the evaporator coil is used to convectively heat a second side of the inlet of the evaporator coil.

Aspect 12. The method for defrosting the evaporator of aspect 11, wherein an electric heating device is provided at an outlet of the evaporator coil and wherein, independently controlling the first fan of the at least two fans to move air around the evaporator coil in the first controlled direction includes the first fan moving air from the inlet of the evaporator coil at the first side of the inlet of the evaporator coil to the outlet of the evaporator coil at a first side of the outlet of the evaporator coil and from the outlet of the evaporator coil at a second side of the evaporator coil to the inlet of the evaporator of the second side of the evaporator coil.

Aspect 13. The method for defrosting the evaporator of any one of aspects 11 and 12, wherein an electric heating device is provided at an outlet of the evaporator coil and wherein independently controlling the first fan of the at least two fans to move air around the evaporator coil in the first controlled direction includes the first fan moving air from the outlet of the evaporator coil at a first side of the evaporator coil to the inlet of the evaporator coil at the first side of the evaporator coil.

Aspect 14. The method for defrosting the evaporator of any one of aspects 11-13, further comprising controlling heating, via an electric heating device, of the area around the evaporator until the evaporator coil is defrosted.

Aspect 15. The method for defrosting the evaporator of any one of aspects 11 to 14, further comprising: monitoring an evaporator parameter of the evaporator coil; and supplying heat to the evaporator based on the evaporator parameter.

Aspect 16. The method for defrosting the evaporator of aspect 15, wherein monitoring the evaporator parameter includes monitoring at least one of evaporator coil temperature data and evaporator pressure data across the evaporator coil.

Aspect 17. The method for defrosting the evaporator of any one of aspects 11 to 16, wherein the transport climate control circuit further comprises a damper, and wherein the controller upon detecting the defrost event condition further closes the damper to prevent air flow from the evaporator to the climate controlled space.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components. The terms first, second, first side, second side, roadside, curbside, etc. are not intended to be limiting, but are only provided to give context of the relationship and understanding of the different features in the different embodiments of the invention.

With regard to the preceding description, it is to be understood that changes may be made in detail, especially in matters of the construction materials employed and the shape, size, and arrangement of parts, without departing from the scope of the present disclosure. The word "embodiment" as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

What is claimed is:

1. A transport climate control system for providing climate control to a climate controlled space of a transport unit, the transport climate control system comprising:
   a transport climate control circuit comprising:
      a compressor that compresses a working fluid passing through the transport climate control circuit,
      an evaporator that absorbs heat from the climate controlled space and evaporates the working fluid, said evaporator comprising:
         an evaporator coil having an inlet side for receiving the working fluid from an inlet of the evaporator coil, the inlet side extending from a first side of the evaporator coil to a second side of the evaporator coil, and an outlet side for returning the working fluid to an outlet of the evaporator coil, the outlet side extending from the first side of the evaporator coil to the second side of the evaporator coil,
         at least two fans that control air flow around the first side of the evaporator coil and the second side of the evaporator coil,
         an electric heating device positioned on the outlet side of the evaporator coil and only extends between the first side and the second side on the outlet side of the evaporator coil, and
         a damper that moves between at least an open position and a closed position to separate the evaporator from the climate controlled space and to control an amount of the air flow between the evaporator and the climate controlled space,
   a controller configured to control the transport climate control circuit and configured to defrost the evaporator coil by:
      closing the damper when a defrost event is triggered to separate the evaporator from the climate controlled space,
      instructing the transport climate control circuit to supply heat to or around the outlet side of the evaporator coil by turning on the electric heating device to generate heat, and
      independently controlling each of the at least two fans to move the air around the evaporator coil in a controlled direction so that heat from the electric heating device at the outlet side of the evaporator coil at one of the first side or the second side of the evaporator coil is used to convectively heat frost formed on the inlet side of the evaporator coil.

2. The transport climate control system of claim 1, wherein instructing the transport climate control circuit to supply heat to or around the outlet side of the evaporator coil includes instructing the transport climate control circuit to direct hot gas from the compressor to the evaporator coil.

3. The transport climate control system of claim 1, wherein the electric heating device comprises a heating fin configured to evenly distribute the heat from the supply of heat along the first side and the second side of the evaporator coil.

4. The transport climate control system of claim 1, wherein at least one of the at least two fans is configured to operate in a positive air flow direction by blowing air towards the evaporator coil and at least one of the at least two fans is configured to operate in a negative air flow direction by drawing air from the evaporator coil.

5. The transport climate control system of claim 1, wherein at least a third fan is provided to further control air flow around the evaporator coil of the evaporator.

6. The transport climate control system of claim 1, wherein the controller is configured to monitor the evaporator coil of the evaporator by monitoring at least one of evaporator coil temperature data and evaporator pressure data across the evaporator coil and automatically defrost the evaporator coil.

7. A method for defrosting an evaporator of a transport climate control circuit of a transport climate control system that provides climate control to a climate controlled space of a transport unit, the transport climate control circuit including a compressor, an evaporator that includes an evaporator coil having an inlet side for receiving a working fluid from an inlet of the evaporator coil, the inlet side extending from a first side of the evaporator coil to a second side of the evaporator coil, and an outlet side for returning the working fluid to an outlet of the evaporator coil, the outlet side extending from the first side of the evaporator coil to the second side of the evaporator coil, at least two fans, an electric heating device, and a damper that moves between at least an open position and a closed position to separate the evaporator from the climate controlled space and to control an amount of the air flow between the evaporator and the climate controlled space, the method comprising:
   a controller of the transport climate control system detecting a defrost event condition;
   upon detecting the defrost event condition:
      closing the damper when a defrost event is triggered to separate the evaporator from the climate controlled space,
      supplying heat to or around the outlet side of the evaporator coil by turning on the electric heating device to generate heat, wherein the electric heating device is positioned on the outlet side of the evaporator coil and only extends across the evaporator coil between a first side and a second side on the outlet side of the evaporator coil;
      independently controlling a first fan of the at least two fans to move air around the evaporator coil in a first controlled direction so that heat from the electric heating device at the outlet side of the evaporator coil at one of the first side or the second side of the evaporator coil is used to convectively heat frost formed on the inlet side of the evaporator coil, and
      independently controlling a second fan of the at least two fans to move air around the evaporator coil in a second controlled direction so that heat from the other side of the evaporator coil is only used to convectively heat the inlet side of the evaporator coil.

8. The method for defrosting the evaporator of claim 7, wherein independently controlling the first fan of the at least two fans to move air around the evaporator coil in the first controlled direction includes the first fan moving air from the inlet side of the evaporator coil at the first side of the evaporator coil to the outlet side of the evaporator coil at the first side of the evaporator coil and from the outlet side of the evaporator coil at the second side of the evaporator coil to the inlet side at the second side of the evaporator coil.

9. The method for defrosting the evaporator of claim 7, wherein independently controlling the first fan of the at least two fans to move air around the evaporator coil in the first controlled direction includes the first fan moving air from the outlet side of the evaporator coil at the first side of the evaporator coil to the inlet side of the evaporator coil at the first side of the evaporator coil.

10. The method for defrosting the evaporator of claim 7, further comprising controlling heating around the evaporator until the evaporator coil is defrosted.

11. The method for defrosting the evaporator of claim 7, further comprising;
   monitoring an evaporator parameter of the evaporator coil; and
   supplying heat to the evaporator based on the evaporator parameter.

12. The method for defrosting the evaporator of claim 11, wherein monitoring the evaporator parameter includes monitoring at least one of evaporator coil temperature data and evaporator pressure data across the evaporator coil.

13. The transport climate control system of claim 1, wherein the frost formed at the inlet side of the evaporator coil is not directly heated by the electric heating device.

14. The transport climate control system of claim 1, wherein the electric heating device is controlled to a temperature at or below 400° F.

\* \* \* \* \*